(12) United States Patent
Andersson et al.

(10) Patent No.: US 8,904,767 B2
(45) Date of Patent: Dec. 9, 2014

(54) METHOD AND APPARATUS FOR COLD STARTING AN INTERNAL COMBUSTION ENGINE

(75) Inventors: Lennart Andersson, Varberg (SE); Bert-Inge Bertilsson, Floda (SE)

(73) Assignee: Volvo Lastvagnar AB, Göteborg (SE)

( * ) Notice: Subject to any disclaimer, the term of this patent is extended or adjusted under 35 U.S.C. 154(b) by 251 days.

(21) Appl. No.: 13/063,296

(22) PCT Filed: Oct. 31, 2008

(86) PCT No.: PCT/SE2008/000623
§ 371 (c)(1),
(2), (4) Date: Mar. 10, 2011

(87) PCT Pub. No.: WO2010/050857
PCT Pub. Date: May 6, 2010

(65) Prior Publication Data
US 2011/0192143 A1    Aug. 11, 2011

(51) Int. Cl.
*F01N 3/00* (2006.01)
*F01N 3/10* (2006.01)
(Continued)

(52) U.S. Cl.
CPC ............ *F01N 3/021* (2013.01); *F01N 3/035* (2013.01); *F01N 3/0835* (2013.01); *F01N 3/0842* (2013.01); *F01N 3/0878* (2013.01);
(Continued)

(58) Field of Classification Search
CPC ..... F01N 3/021; F01N 3/0835; F01N 3/0842; F01N 3/0878; F01N 3/103; F01N 3/106; F01N 3/2066; F01N 2013/026; F02D 13/0242; F02D 13/04; F02D 41/0255; F02D 41/06; F02D 41/062; F02D 2013/0292; Y02T 10/24; Y02T 10/26

USPC ........... 60/274, 284, 285, 287, 292, 295, 297, 60/299, 300, 301, 311

See application file for complete search history.

(56) References Cited

U.S. PATENT DOCUMENTS

| 5,979,158 A | 11/1999 | Kaiser et al. |
| 6,397,586 B1 | 6/2002 | Sakurai et al. |

(Continued)

FOREIGN PATENT DOCUMENTS

| DE | 10306586 A1 | 9/2003 |
| DE | 102004052107 A1 | 5/2006 |

(Continued)

OTHER PUBLICATIONS

Supplementary European Search Report for corresponding European App. EP 08 87 782, Feb. 29, 2012.

(Continued)

*Primary Examiner* — Audrey K Bradley
(74) *Attorney, Agent, or Firm* — WRB-IP LLP

(57) ABSTRACT

The present invention relates to a method for achieving reduced emissions at cold start of an internal combustion engine having an exhaust gas after treatment system comprising at least one Diesel Oxygen Catalyst (DOC), at least one Diesel Particulate Filter (DPF) and a Selective Catalytic Reduction (SCR) unit, comprising the steps of: heating the DOC prior to cold starting said internal combustion engine, starting and controlling the internal combustion engine towards low NOx emission when said DOC has reached a predetermined temperature, optimizing the fuel consumption at a given total emission level when said DPF and SCR has reached a predetermined temperature.

8 Claims, 2 Drawing Sheets

(51) Int. Cl.
*F01N 3/02* (2006.01)
*F01N 3/021* (2006.01)
*F01N 3/035* (2006.01)
*F01N 3/08* (2006.01)
*F01N 3/20* (2006.01)
*F02D 13/02* (2006.01)
*F02D 13/04* (2006.01)
*F02D 41/02* (2006.01)
*F02D 41/30* (2006.01)
*F01N 13/00* (2010.01)
*F02B 1/12* (2006.01)
*F02D 41/06* (2006.01)
*F02M 31/13* (2006.01)
*F02N 11/08* (2006.01)

(52) U.S. Cl.
CPC ............. *F01N 3/106* (2013.01); *F01N 3/2053* (2013.01); *F01N 3/2066* (2013.01); *F02D 13/0242* (2013.01); *F02D 13/04* (2013.01); *F02D 41/0255* (2013.01); *F02D 41/3076* (2013.01); *F01N 13/0097* (2013.01); *F02B 1/12* (2013.01); *F02D 41/062* (2013.01); *F02D 41/3035* (2013.01); *F02D 2013/0292* (2013.01); *F02M 31/13* (2013.01); *F02N 11/08* (2013.01); *Y02T 10/26* (2013.01); *Y02T 10/24* (2013.01)
USPC .................. 60/300; 60/274; 60/284; 60/285; 60/292; 60/297; 60/299; 60/301; 60/311

(56) References Cited

U.S. PATENT DOCUMENTS

| | | | |
|---|---|---|---|
| 2004/0007403 A1 | 1/2004 | Tomatsuri et al. | |
| 2006/0042233 A1 | 3/2006 | Coleman et al. | |
| 2006/0179823 A1* | 8/2006 | Hinz et al. | 60/288 |
| 2006/0213187 A1 | 9/2006 | Kupe et al. | |
| 2008/0295499 A1* | 12/2008 | Driscoll et al. | 60/288 |
| 2008/0314028 A1* | 12/2008 | Christner et al. | 60/286 |

FOREIGN PATENT DOCUMENTS

| | | | |
|---|---|---|---|
| JP | 2008014293 A * | 1/2008 | F01N 3/20 |
| WO | 9425740 | 11/1994 | |
| WO | 9629508 | 9/1996 | |
| WO | 9722789 | 6/1997 | |
| WO | 2005024195 A1 | 3/2005 | |
| WO | WO 2007033751 A1 * | 3/2007 | F02D 41/02 |
| WO | 2007069441 A1 | 6/2007 | |

OTHER PUBLICATIONS

International Search Report for corresponding International App. PCT/SE2008/000623, Jun. 18, 2009.

International Preiiminary Report on Patentability for corresponding International App. PCT/SE2008/000623, Oct. 21, 2010.

\* cited by examiner

METHOD AND APPARATUS FOR COLD STARTING AN INTERNAL COMBUSTION ENGINE

BACKGROUND AND SUMMARY

The present invention relates to a method and apparatus for cold starting an internal combustion engine according.

Vehicles equipped with diesel or another lean burn engine offer the benefit of increased fuel economy, however, control of nitrogen oxide (NOx) emissions from such engines is needed due to the high content of oxygen in the exhaust gas. In this regard, Selective Catalytic Reduction (SCR) catalysts, in which NOx is continuously removed through active injection of a reductant, such as urea, into the exhaust gas mixture entering the catalyst, are known to achieve high NOx conversion efficiency.

However, exhaust gas after treatment systems (EATS or EGAS) need to reach a specific operating temperature before they become active. Therefore, a considerable amount of the overall quantity of pollutants emitted to the atmosphere during a journey is discharged at a very limited period of time during cold start conditions.

To reduce the pollution during such cold start conditions it is desirable to minimize the time required for the exhaust gas after treatment system to reach its operating temperature. Conventionally, this is done by increasing the load on the engine during cold start conditions.

However, a higher load requires more fuel which may lead to increased production of pollution, which is contrary to the desired reduction in emissions.

It is desirable to provide a method for cold starting an internal combustion engine that reduces the fuel consumption and at the same time reduces the pollution.

According to a first aspect of the invention it is provided a method for achieving reduced emissions at cold start of an internal combustion engine having an exhaust gas after treatment system comprising at least one Diesel Oxygen Catalyst (DOC), at least one Diesel Particulate Filter (DPF) and a Selective Catalytic Reduction (SCR) unit. The method comprising the steps of: heating the DOC prior to cold starting said internal combustion engine, starting and controlling the internal combustion engine towards a predetermined limit value of NOx emission when said DOC has reached a predetermined DOC temperature, optimizing fuel consumption at a predetermined total emission level when said DPF and SCR have reached a predetermined temperature.

In another example embodiment of the present invention said heating of said DOC prior to starting said internal combustion engine is performed by cranking the internal combustion engine with an electric device with the fuel supply to said internal combustion engine shut off and with a setting chosen of the internal combustion engine so that air coming out from an outlet valve of a cylinder is higher in temperature than incoming air through an inlet valve of said cylinder.

The advantage with this embodiment is that the heating may be performed by built in devices only, for example in hybrid vehicles the means for cranking the engine may be the electric power source and the setting chosen for the internal combustion engine may be alteration of the closure and opening time of the exhaust valve.

In yet another example embodiment of the present invention said predetermined limit value of NOx emission is achieved by using HCCI combustion principle.

An advantage of this embodiment is that the engine may be run at relatively low temperatures of the EATS and nevertheless fulfill the prevailing pollution requirements.

In still another example embodiment of the present invention said predetermined limit value of NOx emission is achieved by using at least 50% EGR.

An advantage of this embodiment is that the EGR regulation may be used to control the NOx emission at the same time as it is used for decreasing the combustion temperature in HCCI mode or PHCCI mode.

In still another example embodiment of the present invention said heating of said DOC is performed while a vehicle, in which said internal combustion engine is provided, is moving.

An advantage with this embodiment is that the heating is not necessarily performed while the vehicle is standing still and may therefore save time for the driver.

Another advantage may be that the momentum of the vehicle may be used as another source of providing energy to the means for heating the DOC.

In still another example embodiment of the present invention said heating of said DOC is performed while a vehicle, in which said internal combustion engine is provided, is standing still.

An advantage of this embodiment is that the heating is not dependent on the driving condition of the vehicle.

In still another example embodiment of the present invention said setting is an adjustment of the exhaust valve to perform exhaust braking.

An advantage of this embodiment is that existing technology may be used for heating the EATS which is not dependent upon the driving condition for the vehicle.

In still another example embodiment the present invention further comprising the step of: providing a HC-trap, a NOx-trap and a bypass channel with a valve between said DOC and said DPF, closing said bypass valve until said DOC has reached said predetermined temperature, opening said bypass valve when said DOC is at and above said predetermined temperature, closing said bypass valve when an operator requires an engine with a NOx value above the predetermined value when said SCR is below a predetermined temperature.

An advantage of this embodiment is that the regulation of the exhaust gases, and thereby regulating its temperature, may be performed in the EATS by itself either in combination with another heating source or by itself.

In a second aspect of the present invention it is provided a device for achieving reduced emissions at cold start of an internal combustion engine having an exhaust gas after treatment system (EGAS) comprising at least one Diesel Oxygen Catalyst (DOC), at least one Diesel Particulate Filter (DPF) and a Selective Catalytic Reduction (SCR) unit. Said device further comprising a HC trap, a NOx trap and a bypass channel with a valve provided between said DOC and said DPF.

An advantage of this embodiment is that temperature regulation for different units in the EGAS can be done in the unit itself.

In another example embodiment of the present invention said HC-trap and said NOx-trap is provided as separate units.

An advantage with this embodiment is that each trap may be optimized independently of the other trap.

In another example embodiment of the present invention said NOx-trap material is coated on said HC-trap material.

An advantage with this embodiment is that the traps may be compact and therefore requires small space which in turn may reduce the overall size of the EGAS.

In a third aspect of the present invention it is provided a device for achieving reduced emissions at cold start of an internal combustion engine having an exhaust gas after treatment system comprising at least one Diesel Oxygen Catalyst (DOC) at least one Diesel Particulate Filter (DPF) and a Selective Catalytic Reduction (SCR) unit, further comprising: means for heating the DOC prior to cold starting said internal combustion engine, means for starting and controlling the internal combustion engine towards a predetermined limit value of NOx emission when said DOC has reached a predetermined DOC temperature, means for optimizing fuel consumption at a predetermined total emission level when said DPF and SCR have reached a predetermined temperature.

In another example embodiment of the present invention said means for heating of said DOC prior to starting said internal combustion engine is an electric device for cranking the internal combustion engine with the fuel supply to said internal combustion engine shut off and with a setting chosen of the internal combustion engine so that air coming out from an outlet valve of a cylinder is higher in temperature than incoming air through an inlet valve of said cylinder.

The advantage with this embodiment is that the heating may be performed by built in devices only, for example in hybrid vehicles the means for cranking the engine may be the electric power source and the setting chosen for the internal combustion engine may be alteration of the closure and opening time of the exhaust valve.

In another example embodiment of the present invention said device further comprising between said DOC and said DPF a HC-trap, a NOx-trap and a bypass channel with a valve, means for closing said bypass valve until said DOC has reached said predetermined temperature, means for opening said bypass valve when said DOC is at and above said predetermined temperature, means for closing said bypass valve when an operator requires an engine with a NOx value above the predetermined value when said SCR is below a predetermined temperature.

An advantage of this embodiment is that temperature of the EGAS can be controlled by valves in the EGAS and adjustment of the exhaust valve independently of each other for achieving the desired temperature in a most efficient way.

BRIEF DESCRIPTION OF THE DRAWINGS

The present invention may best be understood from the following detailed description of the embodiments, but not restricted to the embodiments, wherein is shown schematically.

In the drawings, equal or similar elements are referred to by equal reference numerals. The drawings are merely schematic representations, not intended to portray specific parameters of the invention.

DETAILED DESCRIPTION

Figure 1:
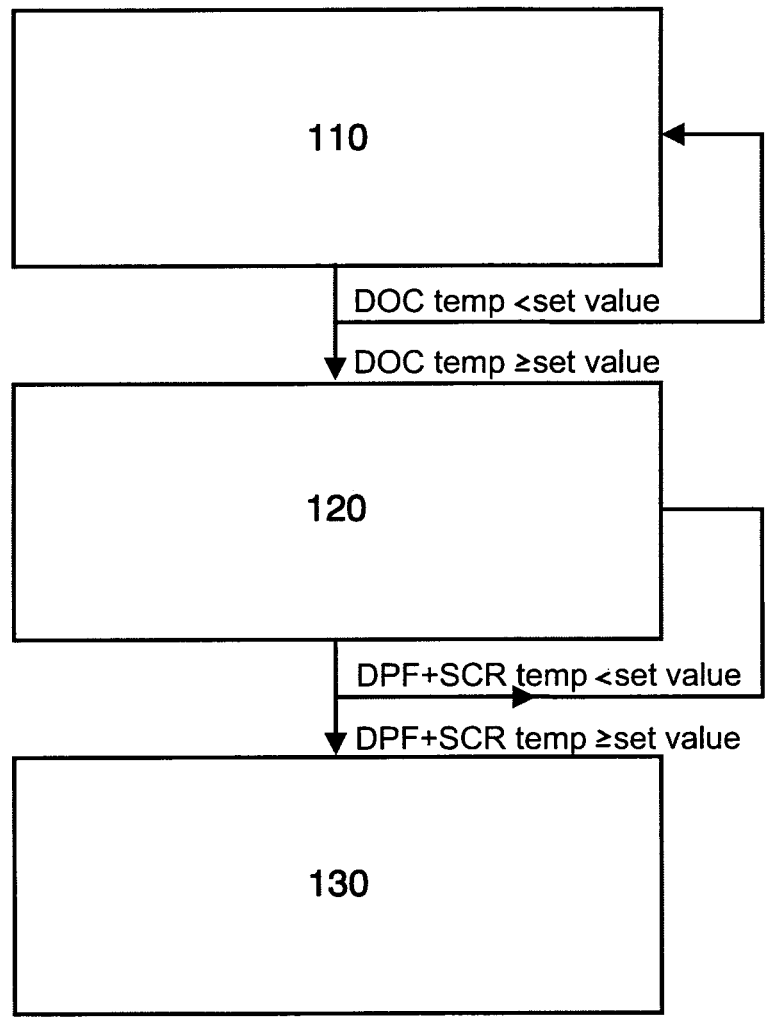
FIG. 1 Illustrates schematically a flow chart of the method for cold starting an internal combustion engine according to the present invention.

FIG. 1 illustrates schematically a flow chart of the method for cold starting an internal combustion engine according to the present invention.

The inventive method will achieve reduced emissions at cold start of an internal combustion engine having an exhaust gas after treatment system comprising at least one Diesel Oxygen Catalyst (DOC), at least one Diesel Particulate Filter (DPF) and a Selective Catalytic Reduction (SCR) unit.

In a first step 110 a heating of the DOC prior to cold starting said internal combustion engine is performed.

Said heating of said DOC prior to starting said internal combustion engine may be performed by cranking the internal combustion engine with an electric device with the fuel supply to said internal combustion engine shut off and with a setting chosen of the internal combustion engine so that air coming out from an outlet valve of a cylinder is higher in temperature than incoming air through an inlet valve of said cylinder.

Said setting mentioned above of the internal combustion engine may be an adjustment of the exhaust valve to perform earlier opening than at normal driving, similar to engine braking which in different example embodiments are described in detail in inter alia WO9425740; WO9629508; 9722789.

Said heating of said DOC may be performed while a vehicle, in which said internal combustion engine is provided, is moving or is standing still.

The electrical device which is cranking the engine without starting it may be an electric motor such as the ones which may be used in hybrid vehicles. Such an electric motor in a hybrid vehicle may be able to crank the engine while the vehicle is standing still and also while the vehicle is moving either in a forward or a backward direction. Another example of an electric motor may be a starter motor with somewhat higher capacity than a normal starter motor which is only used for starting the engine. This starter motor is capable of cranking the engine for a prolonged period of time, however the capacity is not comparable with the electrical engine in the hybrid vehicle, which is also able to deliver power for moving the vehicle. This starter motor with somewhat higher capacity than the normal starter motor may crank the engine while the vehicle is standing still until the DOC temperature has reached a predetermined value.

Other features which may be combined with the above mentioned step of cranking the engine without fuel supply together with exhaust braking which is: closing VGT (Variabel Geometry Turbine), i.e., increasing the backpressure in the exhaust system; opening the EGR (exhaust Gas Recirculation) valve. The optimal point of EGR valve opening is depending on the type of engine and is a function of F (exhaust gas pressure, density of air, environmental temperature, electrical power, etc).

Another mean for increasing the temperature may be to provide a throttle on the intake side of the engine, which may be regulated during heating up phase of the EGAS. Electrical heating of the intake air and/or exhaust gases and/or the DOC may also be used as well as heating the DOC with a fuel cell or a burner using the same fuel as used in the IC engine.

In a second step 120 a starting and controlling of the internal combustion engine towards a predetermined limit value of NOx emission is performed when said DOC has reached a predetermined temperature. The catalytic reaction may start in DOC 120 at about 200° C. and may have its maximum catalytic reaction temperature of about 300-400° C. Therefore, said predetermined temperature of the DOC may be set at any temperature in said interval of 200-400° C. The measurement may be done according to well known practice in the art and as long as the temperature is below the predetermined temperature said heating is continued and the starting of the IC engine is delayed.

One combustion mode which may be used in order to reach the predetermined limit value of NOx emission is HCCI (homogenous charge compression ignition) or PHCCI (partial homogenous charge compression ignition). The difference between HCCI and PHCCI is the procedure for mixing the fuel and air before the combustion. Since the DPF and/or the SCR is still not in its working temperature range, the engine must be driven in a mode in which the NOx and particle pollution is kept at a minimum. The degree of EGR in PHCCI may be 50-70%. Under such hight EGR contents the ignition point is delayed which means that the fuel will have more time to be blended with the air. The high EGR content together with a suitable injection point of fuel may make the combustion temperature so low that NOx and soot are created very slowly.

In a third step 130 the engine is run in a mode where the fuel consumption is minimized at a predetermined total emission level when said DPF and SCR have reached a predetermined temperature.

The predetermined temperature may be set to the working temperature of the DPF which is between 200-700° C. Below 200° C. there will be no transformation of the soot particles into CO2 and above 700° C. the aging of the DPF is severely affected. The predetermined temperature for the SCR may be set to equal temperature interval as for the DPF. As long as the temperature is below the predetermined temperature of the DPF and/or SCR the engine is run in HCCI or PHCCI mode, and if the operator requires load, which can't be run in those kinds of modes, the electric motor will contribute to the required mode.

The optimized fuel consumption has to take into account the legislative emissions levels when driving the engine under certain circumstances.

Further means for controlling the temperature of the EATS may be by providing a HC-trap, a NOx-trap and a bypass channel with a valve between said DOC and said DPF, closing said bypass valve until said DOC has reached said predetermined temperature, opening said bypass valve when said DOC is at and above said predetermined temperature, closing said bypass valve when an operator requires an engine with a NOx value above the predetermined value when said SCR is below a predetermined temperature.

Figure 2:
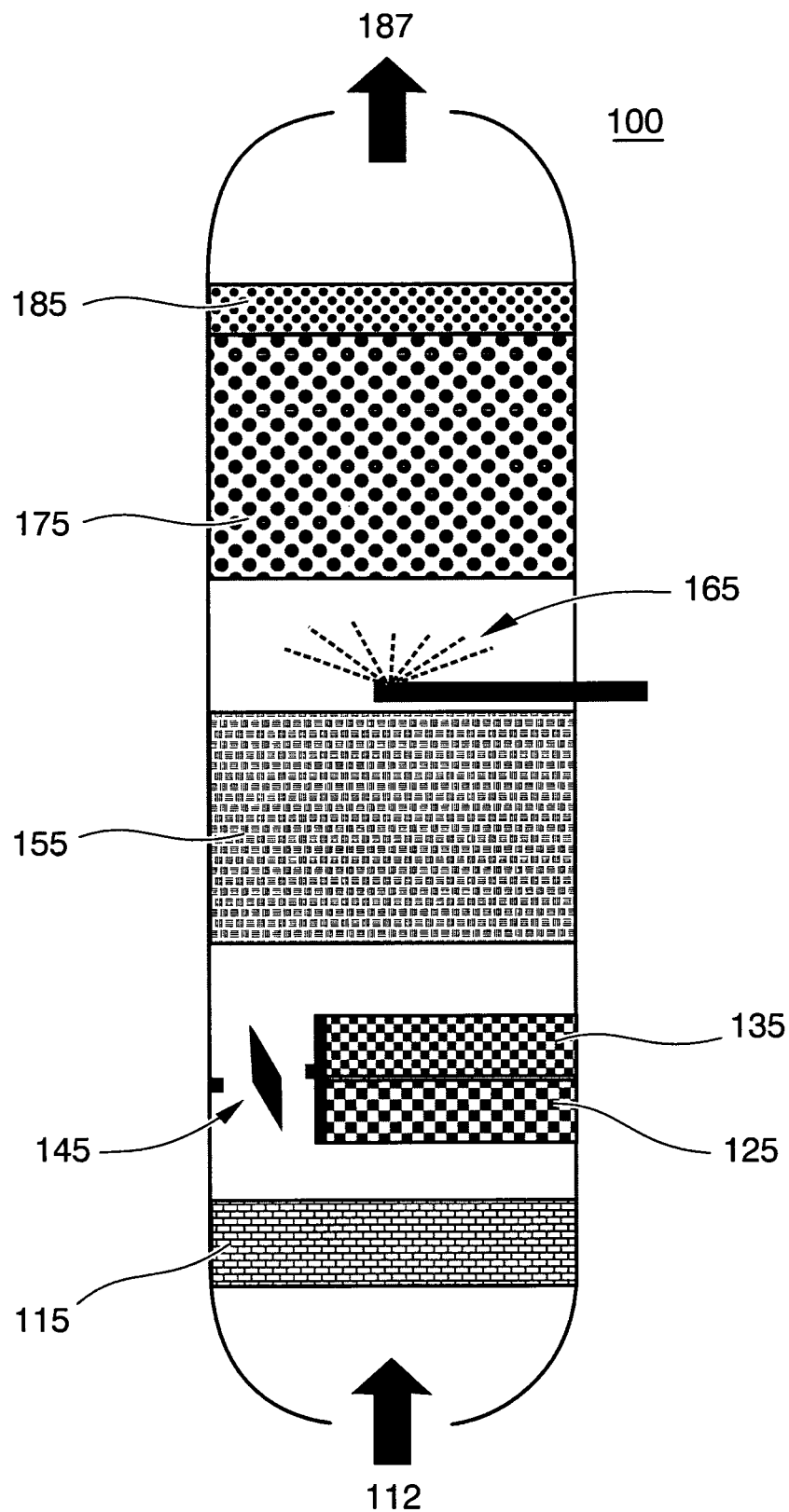
FIG. 2 shows an example embodiment of an exhaust gas after treatment system according to the present invention.

In FIG. 2 an example embodiment of an exhaust gas after treatment system (EATS) 100 according to the present invention. Said EATS is fluidly connected to an internal combustion engine (not shown), e.g., a diesel engine.

Said EATS 100 comprising an inlet 112, a DOC 115, a HC trap 125, a NOx trap 135, a by pass channel 145, a DPF 155, a reductant injector 165, an SCR 175, a clean up catalyst 185 and an outlet 187.

The DOC 115 is in direct fluid communication with the internal combustion engine. The DOC 115 is in this embodiment arranged upstream of the HC trap 125, NOx trap 135, DPF 155, SCR 175 and clean p catalyst 185. The reactions taking place in the DOC 120 may be as follows:

NO+HQ2->NO2 (1)

The temperature in the DOC 120 is depending inter alia of catalyst material; HC, CO and O2 content and mass flow. The catalytic reactions may start in DOC 120 at about 200° C. and for reaction (1) have a maximum catalytic conversion temperature of about 300-400° C. After reaching the maximum reaction temperature the reaction may decline, which declining is depending on the equilibrium reaction, where the reverse reaction

NO2->HO2+NO (2)

CO+HO2->CO2 (3)

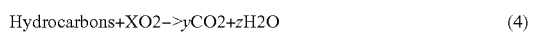

Hydrocarbons+XO2->yCO2+zH2O (4)

is more temperature dependent than equation (1).

The DOC 115 is usually built up in the form of a monolithic structure made of cordierite or metal. Said monolithic structure may be coated with a catalytic material in the form of a base metal oxide and a precious metal, which could be Platinum and/or Palladium.

The HC-trap may be made of a Zeolite material which can adsorb much HC. The Zeolite may have a surface with exchanged ions, where such substituted ions may be platinum, copper or ion. If the Zeolite has platinum, copper or iron ions on its surface a great deal of the HC will be oxidised when the temperature is increased. If the zeolite does not have a surface with such ions, i.e., with an oxidising metal ions, and by itself is not self oxidising, a great deal of the adsorbed HC will be desorbed when the temperature is increased. The degree of adsorbed HC and the degree of oxidised or desorbed HC is dependent on the temperature and the choice of material.

The NOx trap may also be made of zeolite which in this case adsorbs or desorbs NOx. The NOx trap may also consist of or comprise a metal oxide e.g., cerium oxide or barium oxide which oxides may create nitrites nitrates which at higher temperatures will fall apart into inter alia NOx. The NOx trap will adsorb NOx below a predetermined temperature and desorbs NOx above said predetermined temperature. The NOx trap may be provided with a certain amount of Platina on its surface for increasing the speed of creation of nitrites.

The bypass valve 145 will be closed until the DOC has reached a predetermined temperature, for instance 250° C. As the valve 145 is closed HC is trapped in the HC trap 125 and NOx is trapped in the NOx trap 135. When the DOC 115 has reached the predetermined temperature said valve 145 is opened and HC is oxidised in the DOC. When the valve is open the warm exhaust gases will warm up the DPF 155 and SCR 175. During the warm up phase of the DPF and SCR said engine is run in a low NOx mode, for instance HCCI or PHCCI mode whenever possible. If the driver demands power from the engine which cannot be delivered without increasing the NOx level over a certain limit, said bypass valve will be closed and NOx will be trapped in the NO trap 135 during such conditions. When the driver later on demands less power which can be delivered from the engine with a NOx level below said limit, the valve 145 is again opened. When said DPF and SCR is Warm enough according to what is described above, the combustion mode of the engine is switched from HCCI or PHCCI to a conventional combustion mode for all power demands and the bypass valve will always be open under such circumstances. In this conventional combustion mode, where the fuel consumption is minimized with the emission legislation requirements taken into account, the HC trap and NOx trap is heated up to a certain temperature where said trapped HC and NOx may be released. HC will wither be burned in the HC trap as such or in the DPF (if the DPF is designed to do that). NOx from the NOx trap will be reduces in the warm SCR.

If the NOx trap and HC trap including platina, and with a SCR which is in its operating temperature range, said NOx trap may be used for controlling the NO2/NOx content. If NO2/NOx becomes too low after the DPF said bypass valve 145 may be closed so that more NO2 is generated. This in turn will enhance the SCR activity as well as better HC burning in the DPF. However, one has to ensure that the NOx trap so that it does not become full of NOx when the engine is shut off.

The reaction taking place in the DPF 155 may be as follows:

2NO2+C->NO+CO2 (5)

The temperature in the DPF 155 may be affected by the thickness of the soot layer in the DPF 155 and may be as low as about 200° C., but becomes effective above 250° C. At higher temperatures than about 700° C., the aging of the DPF 155 as such and the catalyst (s) arranged downstream said DPF 155 may be heavily affected.

The DPF 155 may be built up from porous forms of cordierite or silicon carbide or sintered metal powder. Said porous form may be coated with a catalytic material in the form of a base metal oxide and a precious metal, which could be Platinum and/or Palladium. In that cases the reactions 1-5 occurs in the DPF.

If too much soot is trapped in the DPF 155, which may be caused by a too low temperature and/or too low NOx/soot from the engine, one may use a heat generator upstream said DPF 155 in order to heat the DPF 155 to an appropriate working temperature. Said heat generator may take different forms. In a first example embodiment the temperature in the DPF 155 may be raised on demand by post-injection of diesel into one or more cylinders of the internal combustion engine and/or post-injection of diesel into the exhaust system upstream of said DOC 115.

The heat is then generated by the oxidation of fuel in the DOC 115 as depicted by equation 4.

The lowest temperature when the reaction (4) will occur depends on the catalytic composition and it also depends inter alia of the content of HC. It may start at 200° C. for reaching DOC 115 outlet temperature of about 350° C. and may start at 280° C. for reaching a peak temperature of 600° C.

The catalytic material and/or the temperature in the DOC 115 affect which one of the equations (1) or (4) is dominating. One may optimize for reaction No. (4), if the purpose of DOC 115 is to increase the temperature of the exhaust gases and one may optimize for reaction No. (1), if the purpose of the DOC 115 is to produce NO2.

Another example of heat generators may be electric heated catalyst.

Another reaction taking place in the DPF 155 is as follows:

$$O2+C->CO2 \qquad (6)$$

The temperature when reaction (6) is fast enough occurs above 550° C., which may be somewhat decreased if the filter is coated with catalyst or if the fuel is added with catalyst to about 450° C. The lower temperature may necessitate a catalyst material added to the fuel, which in turn is adsorbed by the soot particles.

The SCR 175 is in this embodiment arranged downstream said DPF 155. The reactions that may take place in the SCR 175 may be as follows:

$$4NO+4NH3+O2->4N2+6H2O \qquad (7)$$

$$2NO+2NO2+4NH3->4N2+6H2O \qquad (8)$$

$$6NO2+8NH3->7N2+12H2O \qquad (9)$$

$$4NO2+4NH3->2N2+2N2O+6H2O \qquad (10)$$

Because reaction No. (8) is the fastest reaction of reactions (7)-(10) and to avoid reaction No. (10), one wants to keep the ratio of NO/NO2 of about 50:50.

Reaction No (8) may be effective in a temperature range in the SCR 175 from about 200° C. and higher, the reaction starts however at much lower temperatures but the lower the temperature the slower the reaction. The starting temperature for reaction No (7) in the SCR 175 may be about 250° C. Starting points and temperature ranges is somewhat affected by the choice of catalytic material in the SCR 175.

The SCR 175 may be built up in the form of a monolithic structure made of cordierite or metal. Said structure may either be coated with Vanadium oxide on top of a titanium oxide comprising some amount of wolfram oxide or a coating comprising zeolite. The zeolite may comprise some iron or copper content or some other appropriate anti ion. There are also vanadium oxide catalysts which are extruded to monolithic structures, i.e., the catalyst and structure is made of the same material.

In the embodiment as illustrated in FIG. 1, an injector 165 is arranged between the DPF 155 and the SCR 175. Said injector 165 injects a reductant material upstream of said SCR 175. The reductant material may be urea, ammonia, ammonia absorbed in water, ammonium carbonate, or metal cloride salts which may adsorb ammonia.

$$4NH3+3O2->2N2+6H2O \qquad (11)$$

The clean-up catalyst 185 is optional and is used to clean-up excess of ammonia by reaction (11) but the reactions 7-10 may also occur. The catalyst may comprise of a metal oxide and some noble metal and could be coated on a similar structure as the SCR catalyst or even on the same structure.

The invention may be applied to any lean burn internal combustion engine such as a diesel engine, bifuel/flexifuel engine with one or a plurality of cylinders.

The internal combustion engine may be provided in a vehicle such as a lorry, truck, bus, personal car, wheel loader, construction equipment vehicles, boats, stationary engines, etc.

The invention must not be regarded as being limited to the examples of embodiment described above, a number of further variants and modifications being feasible without departing from the scope of the following claims.

The invention claimed is:

1. A method for achieving reduced emissions at cold start of an internal combustion engine having an exhaust gas after treatment system comprising at least one Diesel Oxygen Catalyst (DOC), at least one Diesel Particulate Filter (DPF) and a Selective Catalytic Reduction (SCR) unit, comprising the steps of:
heating the at least one DOC prior to cold starting the internal combustion engine,
starting and controlling the internal combustion engine towards a predetermined limit value of NOx emission when the at least one DOC has reached a predetermined DOC temperature, and
optimizing fuel consumption at a predetermined total emission level when the at least one DPF and SCR have reached a predetermined temperature, at least the at least one DPF and the SCR being located successively in relation to each other and in relation to the exhaust gas after treatment system, the SCR being disposed on a substrate other than the DPF
wherein the heating of the at least one DOC prior to starting the internal combustion engine is performed by cranking the internal combustion entire with an electric device with the fuel supply to the internal combustion engine shut off and with a setting chosen of the internal combustion engine so that air coming out from an outlet valve of a cylinder is higher in temperature than incoming, air through an inlet valve of the cylinder, wherein the setting is an adjustment of an exhaust valve to perform engine braking.

2. The method according to claim 1, wherein the predetermined limit value of NOx emission is achieved by using HCCI combustion principle.

3. The method according to claim 1, wherein the predetermined value of NOx emission is achieved by using at least 50% EGR.

4. The method according to claim 1, wherein the heating of the at least one DOC is performed while a vehicle, in which the internal combustion engine is provided, is moving.

5. The method according to claim 1, wherein the heating of the at least one DOC is performed while a vehicle, in which the internal combustion engine is provided, is standing still.

6. A device for achieving reduced emissions at cold start of an internal combustion engine, comprising:
 an exhaust as after treatment system comprising at least one Diesel Oxygen Catalyst (DOC), at least one Diesel Particulate Filter (DPF) and a Selective Catalytic Reduction (SCR) unit, at least the at least one DPF and the SCR being located successively in relation to each other and in relation to the exhaust gas after treatment system, the SCR being disposed on a substrate other than the DPF,
 means for heating the at least one DOC prior to cold starting the internal combustion engine,
 the internal combustion engine configured to operate towards a predetermined limit value of NOx emission when the at least one DOC has reached a predetermined DOC temperature, and
 the internal combustion engine configured to optimize fuel consumption at a predetermined total emission level when the at least one DPF and SCR have reached a predetermined temperature,
 wherein the means for heating the at least one DOC prior to starting the internal combustion engine is an electric device for cranking the internal combustion engine with the fuel supply to the internal combustion engine shut off and with a setting chosen of the internal combustion engine so that air coning out from an outlet valve of a cylinder is higher in temperature than incoming air through an inlet valve of the cylinder, wherein the setting is an adjustment of an exhaust valve to perform engine braking.

7. A method for achieving reduced emissions at cold start of an internal combustion engine having an exhaust Ins after treatment system comprising at least one Diesel Oxygen Catalyst (DOC), at least one Diesel Particulate Filter (DPF) and a Selective Catalytic Reduction (SCR) unit, comprising the steps of:
 heating the at least one DOC prior to cold starting the internal combustion engine,
 starting and controlling the internal combustion engine towards a predetermined limit value of NOx emission when the at least one DOC has reached a predetermined DOC temperature,
 optimizing fuel consumption at a predetermined total emission level when the at least one DPF and SCR have reached a predetermined temperature, at least the at least one DPF and the SCR being located successively in relation to each other and in relation to the exhaust gas after treatment system, the SCR being disposed on a substrate other than the DPF
 providing a HC-trap, a NOx-trap and a bypass channel with a valve between the at least one DOC and the at least one DPF where the bypass channel with the valve is provided for bypassing the HC-trap and the NOx trap,
 closing the bypass valve until the at least one DOC has reached the predetermined DOC temperature, opening the bypass valve when the at least one DOC is at least at the predetermined DOC temperature, and
 closing the bypass valve when an operator requires an engine with a NOx value above the predetermined limit value of NOx emission when the SCR is below a second predetermined temperature.

8. A device for achieving reduced emissions at cold start of an internal combustion engine, comprising:
 an exhaust as after treatment system comprising at least one Diesel Oxygen Catalyst (DOC), at least one Diesel Particulate Filter (DPF) and a Selective Catalytic Reduction (SCR) unit, at least the at least one DPF and the SCR being located successively in relation to each other and in relation to the exhaust gas after treatment system, the SRC being disposed on a substrate other than the DPF,
 means for heating the at least one DOC prior to cold starting the internal combustion engine,
 the internal combustion engine configured to operate towards a predetermined limit value of NOx emission when the at least one DOC has reached a predetermined DOC temperature, and
 the internal combustion engine configured to optimize fuel consumption at a predetermined total emission level when the at least one DPF and SCR have reached a predetermined temperature, and
 between the at least one DOC and the at least one DPF, a HC-trap, a NOx-trap and a bypass channel with a valve, where the bypass channel with the valve is provided for bypassing the HC-trap and the NOx trap,
 the bypass valve being closable until the at least one DOC has reached the predetermined DOC temperature,
 the bypass valve being openable when the at east one DOC is at least at the predetermined DOC temperature,
 the bypass valve being closable when an operator requires an engine with a NOx value above the predetermined limit value of NOx emission when the SCR is below a second predetermined temperature.

* * * * *